(12) United States Patent
Bartsch et al.

(10) Patent No.: US 8,438,620 B2
(45) Date of Patent: May 7, 2013

(54) PORTABLE DEVICE FOR CLEARING ACCESS

(75) Inventors: Armin Bartsch, Gröbenzell (DE); Robert Müller, Riemerling (DE); Elmar Stephan, München (DE)

(73) Assignee: Giesecke & Devrient GmbH, Munich (DE)

( * ) Notice: Subject to any disclaimer, the term of this patent is extended or adjusted under 35 U.S.C. 154(b) by 1046 days.

(21) Appl. No.: 11/662,655

(22) PCT Filed: Sep. 8, 2005

(86) PCT No.: PCT/EP2005/009670
§ 371 (c)(1), (2), (4) Date: Jan. 28, 2008

(87) PCT Pub. No.: WO2006/029758
PCT Pub. Date: Mar. 23, 2006

(65) Prior Publication Data
US 2008/0244720 A1 Oct. 2, 2008

(30) Foreign Application Priority Data
Sep. 14, 2004 (DE) .......... 10 2004 044 454

(51) Int. Cl.
*G06F 21/00* (2006.01)

(52) U.S. Cl.
USPC ............ 726/9; 713/255; 713/185; 709/218; 709/229; 705/51

(58) Field of Classification Search ........... 726/9, 8
See application file for complete search history.

(56) References Cited

U.S. PATENT DOCUMENTS

| 7,577,659 | B2 * | 8/2009 | Schutz et al. ............... 1/1 |
| 8,205,793 | B2 * | 6/2012 | Oved .................... 235/380 |
| 2002/0124092 | A1 | 9/2002 | Urien |
| 2003/0051173 | A1 * | 3/2003 | Krueger ................. 713/202 |
| 2003/0145197 | A1 * | 7/2003 | Lee et al. ............... 713/155 |
| 2003/0158891 | A1 * | 8/2003 | Lei et al. ............... 709/203 |
| 2003/0212904 | A1 * | 11/2003 | Randle et al. ........... 713/200 |
| 2004/0123106 | A1 | 6/2004 | D'Angelo et al. |
| 2004/0123113 | A1 * | 6/2004 | Mathiassen et al. ...... 713/185 |
| 2004/0125553 | A1 * | 7/2004 | Castell et al. .......... 361/683 |
| 2004/0147285 | A1 | 7/2004 | Urien |
| 2005/0187883 | A1 * | 8/2005 | Bishop et al. ............ 705/67 |

FOREIGN PATENT DOCUMENTS

| EP | 0 757 336 B1 | 11/2000 |
| GB | 2 372 178 A | 8/2002 |
| WO | WO 02/23367 A1 | 3/2002 |
| WO | WO 0223367 A1 * | 3/2002 |

OTHER PUBLICATIONS

Search Report of German Patent Office related to German Patent Application DE 10 2004 044 454.4, Jul. 11, 2005.

* cited by examiner

*Primary Examiner* — Taghi Arani
*Assistant Examiner* — Mahfuzur Rahman
(74) *Attorney, Agent, or Firm* — Bacon & Thomas, PLLC

(57) ABSTRACT

A portable device for activating access in or over a computer network that is connectable to a terminal, which is connected to the computer network at least temporarily. The portable device is configured to be insertable into a communication path between the terminal and the computer network, for authenticating a user, and for providing access data for activating access.

20 Claims, 3 Drawing Sheets

PORTABLE DEVICE FOR CLEARING ACCESS

FIELD OF INVENTION

This invention relates to a portable device for activating access in or over a computer network. The invention further relates to a system and method for activating access in or over a computer network.

BACKGROUND

A number of different procedures as well as various aids are known for activating access in or over a computer network for a user. The access may be for example to certain, in particular fee-based, Internet pages or applications accessible over the Internet, such as Internet banking. Activating such access in many cases requires a correct input for example of a user identification and password in specially provided entry fields of a preceding access page. The input can be effected manually with the help of a terminal connected to the computer network. If a user desires access to different Internet pages or applications, it is required that he has knowledge of a corresponding number of user names and associated passwords and input them into the terminal in each case. Multiple use of the same data might be possible, but is at the expense of security.

Instead of manual password input, it is also possible to equip the user with a portable security data carrier to be used for performing authentications. However, this presupposes that suitable software permitting access to the portable security data carrier is installed on the terminal which is still required. The installation of such software is problematic in particular when access is to be effected via the terminal of a third party. This situation can occur for example during a customer call by a sales representative when the latter wishes to access his company's server. Similar difficulties occur when a computer at an Internet café is to be used for access. In such cases it is as a rule impossible to use a customary security data carrier since software installation by the user is out of the question.

To solve this problem it is known to use a device which indicates a number on a display at the touch of a button. This number is read by the user and entered for example as a one-time password on a protected Internet page by means of the terminal. The user is thereupon given access to the desired server via the terminal for a certain time. A disadvantage of this procedure, however, is that the one-time password must be typed into the terminal in each case. It is further disadvantageous that access to the system can be achieved by anyone who is in possession of the device for password generation. Loss of the device can therefore be extremely critical. If access both via a security data carrier and via a one-time password is to be possible, a separate portal is required for each access method. For example, for Internet banking many banks offer both a portal for access by HBCI card and a portal for the PIN/TAN method. HBCI stands for home banking computer interface, PIN for personal identification number and TAN for transaction number. This two-pronged approach has the consequence of high effort on the part of the provider.

US 2003/0051173 A1 discloses a system for limiting access to a computer which has an authentication gateway through which the user can access the computer. The authentication gateway receives one or more access codes from the user to authenticate the identity of the user. The authentication gateway further provides the computer with one or more authenticated access codes so that the user can access the computer. This does relieve the burden on the user, who need only authenticate himself to the authentication gateway. However, the system is not very flexible, since an availability of the authentication gateway is required in each case. Furthermore, if there is an attack on the authentication gateway a great number of users are as a rule affected, so that effective security measures are required.

SUMMARY

The invention is based on the problem of permitting a secure, comfortable and preferably universally available activation of access in or over a computer network.

In the inventively designed portable device for activating access in or over a computer network to which a terminal is connected at least temporarily, functionalities are implemented for inserting the portable device into a communication path between the terminal and the computer network, for authenticating a user, and for providing access data for activating access.

The invention has the advantage that the access data need not be known to the user, since they are provided by the portable device in each case. This is particularly advantageous when a plurality of accesses are to be activated with different access data. In this case, too, the user need only be able to authenticate himself to the portable device and then has the possibility of activating the desired access with the portable device. Said activation requires no manual inputs by the user, so that there is a time saving. This operator convenience does not go against security, since the authentication of the user to the portable device, which is required for activation, can be made very secure.

A further advantage of the invention is that the user can carry the portable device with him and can thus activate access from any terminal. It is not necessary for special software to be installed on the terminal for use of the portable device. In particular, no special interface or other add-on equipment coordinated with the desired access is required. This reduces the effort and increases the flexibility in use of the portable device. Use of the portable device does not involve any additional effort on the part of the provider of a service to which access is to be gained, since the portable device simulates for the provider the conventional procedure in activating access. Thus, only one access portal need be provided and maintained, which can be used equally well with or without the portable device.

It is further advantageous that the user can himself determine, via the use of an accordingly designed portable device, which requirements he must meet for gaining access, independently of the requirements to be met for activating access. This permits his preferences and his security needs to be optimally taken into account.

The portable device furthermore increases the system security, since users are no longer tempted to write down their access data, use them multiply for different accesses, or store them in an insecure environment.

The portable device can be associated personally with a user or group of users. This leads to a further increase of security, since a use of the portable device requires both its possession and a correct authentication. Furthermore, in case of a successful attack the damage is limited to an improper use of the access data of one user or user group.

In one embodiment, the portable device has a sensor device for detecting a biometric feature. This provides the possibility of performing the authentication of the user to the portable device solely or additionally on the basis of the biometric feature.

The portable device preferably has a server program implemented therein. In particular, the portable device is operable as a proxy server. This has the advantage that the portable device can be inserted into the communication path between the terminal and the computer network in very simple fashion and without the installation of special additional software on the terminal.

The access data can be stored in the portable device so as to be protected from access. There is likewise the possibility of the access data being generated with the portable device. In both cases a high security level can be obtained. It is particularly advantageous if the portable device can independently perform measures, i.e., procedures, for activating access. This makes it possible to realize fast and reliable activation of access.

In an advantageous embodiment, the portable device is configurable with regard to the access or accesses to be activated therewith. This guarantees universal applicability of the portable device. The configuration can specify the modalities for providing the access data and/or the content of the access data. The configuration can be creatable by means of a manual and/or software-supported execution of at least part of the sequence during the activation of access. This permits a simple and comfortable creation of the configuration.

A main field of application of the invention is in the area of the Internet, i.e. the computer network is preferably the Internet. The portable device is preferably formed as a chip card. A chip card fulfills high security standards, can be carried by the user well, and is available cost-effectively.

The inventive system for activating access in or over a computer network has a terminal which is connected to the computer network at least temporarily, and a portable device. The portable device has implemented therein functionalities for inserting the portable device into a communication path between the terminal and the computer network, for authenticating a user, and for providing access data for activating access.

The invention relates further to a method for activating access in or over a computer network to which a terminal is connected at least temporarily. In the inventive method, a data connection is produced between the terminal and a portable device for providing access data, the portable device is inserted into a communication path between the terminal and the computer network, the portable device performs an authentication of the user, and in case of successful authentication of the user the portable device causes the activation of access with the help of the access data.

The terminal can use for communication with the portable device the same software with which it communicates in the computer network, or software stored on the portable device. In neither case is there a need for additional software to be installed on the terminal specifically for communication with the portable device.

The authentication of the user to the portable device as required in the inventive method can be effected by means of secret information which is input into the terminal and/or by means of a biometric feature of the user which is detected by the portable device, or in another known way.

In a preferred embodiment of the inventive method, the procedure for activating access is invisible to the user. Activation of the access is caused in particular by the portable device performing an entry of the access data into an entry field or plurality of entry fields of an access page. The inventive method can be used for example to activate access to data or an application.

BRIEF DESCRIPTION OF THE DRAWINGS

The invention will hereinafter be explained with reference to the embodiments shown in the drawing.

The figures are described as follows.

DETAILED DESCRIPTION OF VARIOUS EMBODIMENTS

Figure 1:
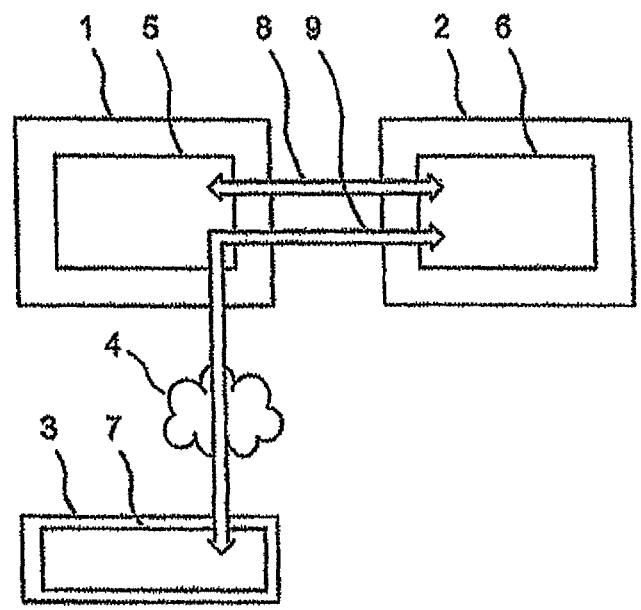
FIG. 1 a schematic block representation for an arrangement for activating access in the inventive way, FIG. 2 a schematic block representation of the arrangement from FIG. 1 at the onset of the inventive activating method, FIG. 3 a block representation corresponding to FIG. 2 at a later time during the inventive activating method, FIG. 4 a block representation corresponding to FIG. 2 at an even later time during the inventive activating method, and FIG. 5 a flow chart to illustrate a possible procedure for configuration of the portable device.

FIG. 1 shows a schematic block representation for an arrangement for activating access in the inventive way. It shows a terminal 1, a portable device 2, a computer 3 of a service provider and a computer network 4. The terminal 1, which is connected to the computer network 4 at least temporarily for this purpose, is to be used to gain access to an application or to data which are available through the computer 3. The computer 3 is likewise connected to the computer network 4 or is a component of the computer network 4.

The terminal 1 is for example a personal computer, a telephone, a personal digital assistant, etc. The terminal 1 executes a browser program 5 which is alternatively installed on the terminal 1 or stored in the portable device 2 and loaded from there into the terminal 1. To permit an input of data by a user and an output to the user, the terminal 1 can have a keyboard and a display which are not shown in the drawing. The portable device 2 is associated personally with a single user or group of users and formed for example as a chip card or token. The portable device 2 has secret access data stored therein so as to be protected from access. Alternatively or additionally, the terminal 1 or also the portable device 2 is able to generate access data. The portable device 2 executes a server program 6 by which the portable device 2 is given the function of a proxy server through which the communication between the terminal 1 and the computer 3 is handled. On the computer 3, which is operated for example by a bank as the service provider, a server program 7 is installed. As a typical service which is available through the computer 3 and to which the user wishes to gain access, Internet banking will be considered hereinafter by way of example, in which the user completes his banking transactions over an Internet connection. The computer network 4 can accordingly be in particular the Internet. However, access to other services or to information can also be activated within the scope of the invention, and computer networks 4 other than the Internet can also be used.

The terminal 1 and the portable device 2 are interconnected over a first communication channel 8 so that the browser program 5 of the terminal 1 and the server program 6 of the portable device 2 can communicate with each other. To form the first communication channel 8, the terminal 1 and the portable device 2 can be connected for example over a USB connection. USB stands for universal serial bus. If the portable device 2 is formed as a chip card with a contact pad, the connection is effected through contacting of the contact pad by a contacting device of the terminal 1. In addition there are a great number of further ways of producing a data connection between the terminal 1 and the portable device 2 by galvanic contacting or wirelessly and thereby forming the first communication channel 8.

The portable device 2 is connected to the computer 3 over a second communication channel 9. Since the physical connection to the computer network 4 is effected as a rule through the terminal 1, the second communication channel 9 extends from the portable device 2 through the terminal 1 and from there further over the computer network 4 to the computer 3. However, a direct connection of the portable device 2 to the computer network 4 is likewise conceivable.

Despite its connection to the computer network 4, the terminal 1 does not communicate with the computer 3 directly over the computer network 4 but, as given by the two communication channels 8 and 9, indirectly through the portable device 2, which is operated for this purpose as a proxy server. The data transmission is carried out by the hypertext transfer protocol HTTP. The inclusion of the portable device 2 in the communication between the terminal 1 and the computer 3 permits the inventive participation of the portable device 2 in the activation of access to a service, or to information, available through the computer 3. The portable device 2 is included in the communication between the terminal 1 and the computer 3 on the basis of the already present software, so that no special additional software need be installed on the terminal 1 for use of the portable device 2. No additional software need be installed on the computer 3 either. A direct network access from the terminal 1 to the computer network 4 can still be possible simultaneously.

The activation will be explained hereinafter with reference to FIGS. 2 to 4 by way of example for access to an Internet banking portal.

Figure 2:
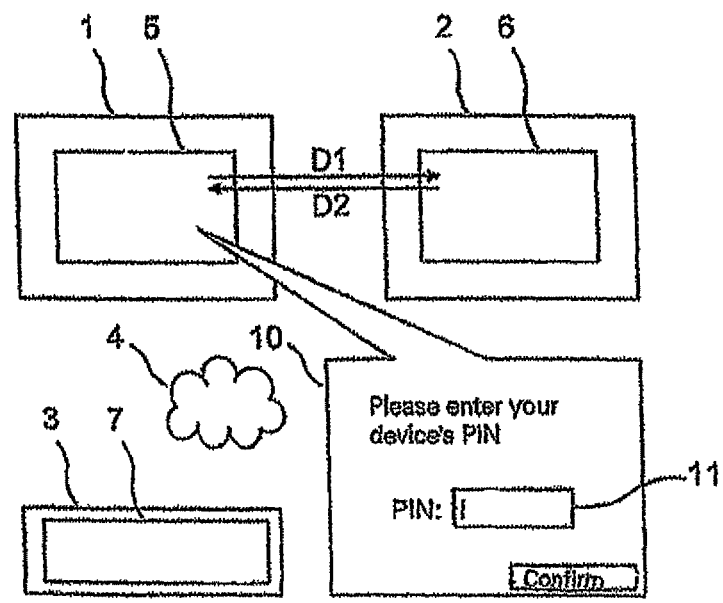

FIG. 2 shows a schematic block representation of the arrangement from FIG. 1 at the onset of the inventive activating method. Instead of the communication channels 8 and 9, the flow of information during a section of the inventive activating method is shown. This also applies to FIGS. 3 and 4.

To form the arrangement according to FIG. 2, the user connects his portable device 2 to the terminal 1 from which the access to Internet banking is to be effected. The user further starts the browser program 5 of the terminal 1 which is installed on the terminal 1 in a suitable configuration or is loaded from the portable device 2 and addresses the portable device 2 as a proxy server. The user likewise starts a program which opens the second communication channel 9 over which the server program 6 of the portable device 2 can take up contact with the computer network 4 and thus also with the computer 3. If a suitably utilizable channel is already part of the installed operating system, this measure can be omitted. Furthermore, the program can also serve to open, or suitably configure, the first communication channel 8.

The user then invokes an access page for his bank's Internet banking by a corresponding input to the terminal 1 to query for his account balance for example. The access page is shown in FIG. 3 and marked by the reference number 12 there. The browser program 5 of the terminal 1 passes the request on to the portable device 2. This is shown in FIG. 2 by an arrow, marked D1, from the terminal 1 to the portable device 2. Accordingly, the other flow of information between the terminal 1, the portable device 2 and the computer 3 is also shown in FIGS. 2, 3 and 4 by arrows each indicating the direction of flow of information. To answer the request of the terminal 1, the portable device 2 transmits to the browser program 5 of the terminal 1 as data D2 a stored authentication page 10 on which the user is asked to enter his PIN, i.e. his personal identification number, for the portable device 2 in an entry field 11. A possible embodiment of this authentication page 10 is shown in FIG. 2. The PIN is needed for an authentication of the user to the portable device 2 in order to prevent use of the portable device 2 by unauthorized third parties. Alternatively, authentication by means of a biometric feature is also possible. For this purpose, the portable device 2 can be equipped with a biometric sensor, for example a fingerprint sensor. The further course of the inventive activating method is shown in FIG. 3.

Figure 3:
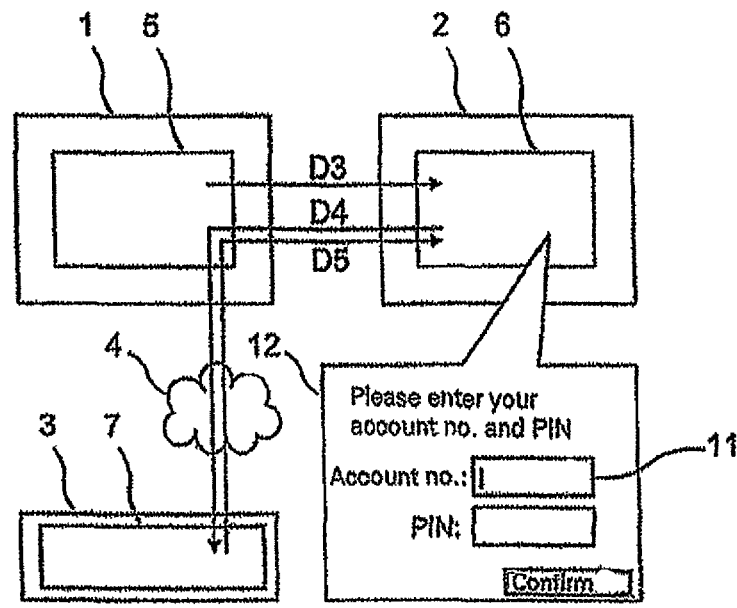

FIG. 3 shows a block representation corresponding to FIG. 2 at a later time during the inventive activating method. After the PIN is input to the terminal 1 it is transmitted by the terminal 1 as data D3 to the portable device 2. The portable device 2 checks whether the received PIN is correct and thus authentication has been successful. After successful authentication, the portable device 2 requests the bank's access page 12 over the computer network 4 from the computer 3 independently, i.e. without being specifically caused to do so at this time by the user or the terminal 1. The request is shown in FIG. 3 as data D4 and is preferably executed such that this process is not made known to the user. The transmission of the request is effected, like all the other communication between the portable device 2 and the computer 3, over the network connection of the terminal 1. The terminal 1 does not influence the communication, however, but serves only to pass on the data.

Following the request of the portable device 2, the computer 3 transmits the access page 12 as data D5 to the portable device 2. The access page 12 received by the portable device 2 is shown in FIG. 3. The access page 12 has two entry fields 11 for input of an account number and a PIN of the user for Internet banking. Said PIN is not related to the PIN for use of the portable device 2 and as a rule also has a different value. The portable device 2 fills in the entry fields 11 independently and in particular without the user's knowledge. For this purpose, the portable device 2 falls back on secret information stored in a secure environment of the portable device 2. It is thus not required that the user know the information needed for the entry fields 11. The user only has to know the information needed for authentication to the portable device 2. Finally, the steps of the inventive activating method shown in FIG. 4 are performed.

Before the access data are entered or before the data are sent back to the computer 3, the portable device 2 can check whether the access page and/or other pages on the computer 3 have changed and, if so, refuse the entry of the access data. The portable device 2 checks for example by means of a hash value whether a page has changed since the last call, since the first call or since the configuration of the portable device.

Figure 4:
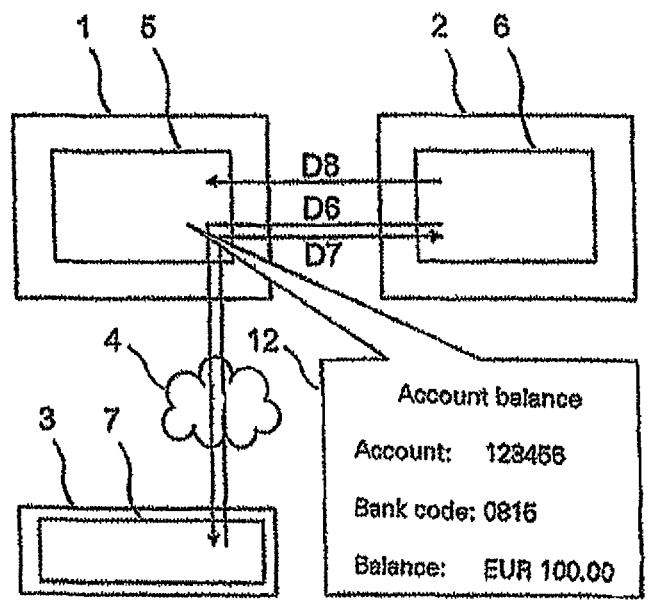

FIG. 4 shows a block representation corresponding to FIG. 2 at an even later time during the inventive activating method. The portable device 2 sends the filled-in access page 12 as data D6 back to the computer 3. The latter checks the data entered in the entry fields 11. If the data are correct, the computer 3 activates access to Internet banking. As one action in the course of Internet banking, the bank's computer 3 transmits a result page 13 showing the user's account balance as data D7 to the portable device 2. The portable device 2 thereupon transmits the result page 13 as data D8 to the terminal 1. The terminal 1 displays the received result page 13 to the user for example in the form shown in FIG. 4.

Subsequently, the user can request by a corresponding input to the terminal 1 through the portable device 2 further information from the computer 3 or perform transactions, such as remittances. In particular for carrying out transactions it can be necessary to transmit a transaction number, TAN for short, to authorize the transaction. A TAN can only be used once for a transaction and is subsequently no longer valid. The portable device 2 can be formed so as to generate the particular required TAN with the help of a one-time password generator. Alternatively, it is also possible that the portable device 2 reads the TAN from a list which is stored in the secure environment in the portable device 2. In either case the TAN is entered in the specially provided entry field 11 on a page of the bank transmitted from the computer 3 to the portable device 2 for this purpose. However, this presupposes that the portable device 2 is being used lawfully, i.e. that authentication of the user to the portable device 2 has previously been performed successfully.

Accordingly, the portable device 2 can also be used to gain access to other services or information. This is also possible when the services or information are supplied by different providers. In each case it is merely required that the user has previously authenticated himself to the portable device 2. The user need not concern himself with the details of producing access to the particular service or information. In particular, he does not have to have any knowledge of the required access data, since they are stored securely in the portable device 2. Thus, for activating a multiplicity of accesses each requiring different access data, the user need only remember one PIN or can use the same biometric feature.

For the portable device 2 to be able to fill the entry fields 11 with the required data automatically, a configuration is previously required at least once. The configuration involves defining which entry fields 11 are filled with which data. This can be realized for example by scripts. The procedure during configuration is explained with reference to FIG. 5 by way of example for the access page 12. Alternatively, the configuration data can also be provided by the service provider on the Internet page, for example as script.

Figure 5:
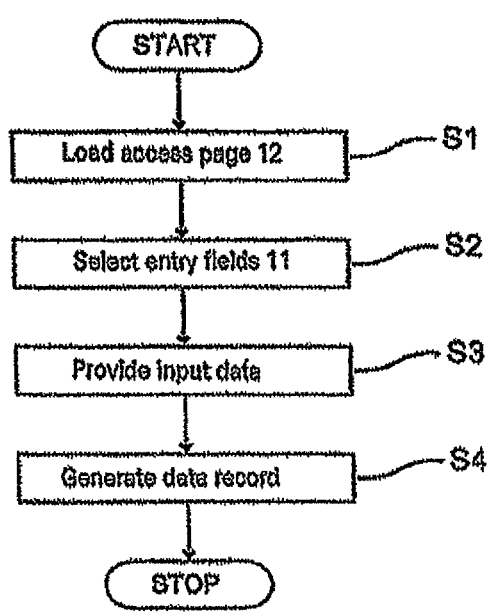

FIG. 5 shows a flow chart to illustrate a possible procedure during configuration of the portable device 2. For carrying out the configuration, a configuration program is executed externally or on the portable device 2. As a further variant it is also possible that the configuration program is executed partly externally and partly on the portable device 2. External execution can be done for example on a personal computer. The hereinafter described variant for carrying out the configuration moreover requires manual inputs by the user. A fully automatic or a completely manual configuration is also fundamentally possible.

The run of the flow chart starts with a step S1 for loading the access page 12 which is to be filled in automatically by the portable device 2. Step S1 is followed by a step S2 in which the entry fields 11 of the access page 12 to be filled in are selected by the user of the configuration program. Subsequently, a step S3 is performed in which the data to be entered in the entry fields 11 of the access page 12 are supplied by the user of the configuration program. Finally, a step S4 follows in which a data record is generated, e.g. in the form of one or more scripts, on the basis of an analysis of the access page 12, the selected entry fields 11 and the data supplied for the entry fields 11. With the help of this data record the portable device 2 can enter the data in the entry fields 11 independently in its function as a proxy server upon future calls of the access page 12. Step S4 ends the run of the flow chart and completes the configuration of the portable device 2 for the access page 12. The configuration can be performed analogously for further access pages 12.

In a development of the portable device 2, the latter is able to perform elaborate authentication methods, such as challenge-response methods, public key methods, etc., during activation of the access.

The access data can optionally be read out from the portable device, for example after input of an overriding PIN by the user or other user authentication. This option can be helpful upon a reconfiguration of the portable device, or in the case that said data are needed for direct access to a service, without use of the portable device.

The invention claimed is:

1. A portable device configured to activate access in or over a computer network to which a terminal is connected at least temporarily, comprising:
    a communication device configured to form at least a first communication path between the terminal and the portable device;
    said portable device being configured to form at least a second communication path between the computer network and portable device,
    wherein functionalities of the portable device are insertable into a communication path between the terminal and the computer network by creating an indirect communication path between the terminal and the computer network through the portable device through the at least one first communication path and the at least one second communication path,
    wherein the portable device is configured to provide access data to activate access in or over the computer network,
    wherein the portable device independently performs procedures that cause the automatic activating of access in or over the computer network, and
    wherein the portable device has a configuration to enable specifying modalities for at least one of providing the access data and providing content of the access data.

2. The portable device according to claim 1, wherein the portable device is associated personally with a user or group of users.

3. The portable device according to claim 1, wherein said functionalities include functionalities for authenticating a user.

4. The portable device according to claim 1, including a sensor device for detecting a biometric feature.

5. The portable device according to claim 1, including a server program.

6. The portable device according to claim 1, wherein the portable device is operable as a proxy server.

7. The portable device according to claim 1, wherein the portable device is operable as a gateway.

8. The portable device according to claim 1, wherein the access data are stored in the portable device so as to be protected from access.

9. The portable device according to claim 1, wherein the access data can be generated therewith.

10. The portable device according to claim 1, wherein the portable device is configured to recognize changes of an Internet page and does not provide the access data if changes on an access page are recognized.

11. The portable device according to claim 1, wherein the configuration is creatable by at least one of a manual and software-supported execution of at least part of a sequence during an activation of access.

12. The portable device according to claim 1, wherein the computer network is an internet.

13. The portable device according to claim 1, wherein the portable device is formed as a chip card.

14. A system for activating access in or over a computer network, comprising:
    a terminal connected to the computer network at least temporarily, and
    a portable device having a communication device configured to form at least a first communication path between the terminal and the portable device, said portable device being configured to form at least a second communication path between the computer network and portable device, wherein functionalities of the portable device are insertable into a communication path between the terminal and the computer network by creating an indirect communication path between the terminal and the computer network through the portable device through the at least one first communication path and the at least one second communication path, wherein the portable device is configured to provide access data to activate access in or over the computer network, wherein the portable device independently performs procedures that cause the automatic activating of access in or over the computer network, and wherein the portable device has a configuration to enable specifying modalities for at least one of providing the access data and providing content of the access data.

15. A method for activating access in or over a computer network to which a terminal is connected at least temporarily, comprising:

producing a data connection to form a first communication path between the terminal and a portable device for providing access data, producing a second communication path between the computer network and portable device, inserting functionalities of the portable device into a communication path between the terminal and the computer network by creating an indirect communication path between the terminal and the computer network through the portable device through the first communication path and the second communication path, activating of access in or over the computer network by said portable device providing access data, and independently performing procedures with the portable device to cause the automatic activating of access in or over the computer network, wherein the portable device has a configuration to enable specifying modalities for at least one of providing the access data and providing content of the access data.

16. The method according to claim 15, wherein the terminal uses for communication with the portable device at least partly identical to software with which it communicates in the computer network or software stored on the portable device.

17. The method according to claim 15, wherein an authentication of an user to the portable device is effected by means of secret information which is at least one of input to the terminal and using a biometric feature of the user which is detected by the portable device.

18. The method according to claim 15, wherein a procedure for activating access is invisible to an user.

19. The method according to claim 15, wherein the activating of access is caused by the portable device performing an entry of the access data in an entry field or a plurality of entry fields of an access page.

20. The method according to claim 15, wherein an access to data or an application is activated.

* * * * *